April 24, 1956  N. B. LAU BACH  2,743,088
HEAT EXCHANGE AND DRIVE TRANSMISSION THEREFOR
Filed Oct. 19, 1950  2 Sheets-Sheet 1

Neal B. LauBach
INVENTOR.

BY Browning & Simms

ATTORNEYS

April 24, 1956  N. B. LAU BACH  2,743,088
HEAT EXCHANGE AND DRIVE TRANSMISSION THEREFOR
Filed Oct. 19, 1950  2 Sheets-Sheet 2

Neal B. LauBach
INVENTOR.

BY Browning & Simms

ATTORNEYS

United States Patent Office 2,743,088
Patented Apr. 24, 1956

2,743,088

HEAT EXCHANGER AND DRIVE TRANSMISSION THEREFOR

Neal B. Lau Bach, Houston, Tex., assignor to Hudson Engineering Corporation, Houston, Tex., a corporation of Texas Application October 19, 1950, Serial No. 191,055

2 Claims. (Cl. 257—137)

This invention relates to improvements in drive transmissions and refers more particularly to transmitting torque from an engine to a remote device to be driven, and particularly where the device to be driven is an auxiliary device consuming only a small portion of the power output of the engine.

A common and representative example of such a power transmission is frequently found in gasoline plants. In such plants there is usually one or more large engines having a stationary mounting within a building or shed, the engines being capable of developing in the neighborhood of 300 H. P. and greater. In such plants there usually exists a cooling problem. For example, jacket water must be cooled after which it is recirculated to various water jackets within the plant including the water jacket for the engine which has been mentioned. Also, it is usually necessary to cool lube oil and gas in various stages of compression.

This cooling requirement can and frequently is met by employing a plurality of mechanical draft direct air heat exchangers. In these heat exchangers, air is forced or drawn by fan through heat exchange equipment including a plurality of tubes through which the material to be cooled is circulated. These heat exchangers, as a matter of convenience and practical necessity, are mounted outside the building or shed which houses the engine.

The fans, pumps, and the like in such cooling installations have been conveniently driven by electric motors on many occasions. However, it is frequently the case that electric power is not conveniently available at gasoline plants because they are located in the field. Also, the electric motor for driving the fan is expensive both in its initial cost and in its operation cost. On the other hand, the large engines usually are capable of performing their main job and also driving fans for cooling purposes, for these fans usually have a power requirement which is only a small fraction of the power of the engine. In view of this, it has heretofore been attempted to drive the fans directly from the engines and this at first appears to be a very convenient way of powering the fans because usually the fan should be rotated at an R. P. M. of approximately that of which the engine operates. For example, the engine R. P. M. usually varies between 200 to 500, and the fan shaft will turn at approximately 180 R. P. M. to 500 R. P. M. In view of this, a direct connection has been made providing for only sufficient adjustment of the R. P. M. as required to rotate the fan at its rated R. P. M.

This direct drive of the fan has, however, in practice proved undesirable. In practice, parts of the drive transmission are frequently sheared, and this apparently is due to the necessity of employing a heavy drive shaft to connect between the motor and the fan. Inasmuch as the power required for driving the fan, though only a small fraction of the engine power, is nevertheless considerable, the shaft, of necessity, has been of heavy construction to provide the requisite strength and it has, of necessity, been rather long for it must extend from the engine to the cooling equipment which is constructed exteriorly of the engine house. Such drive mechanism has considerable inertia, to which is added the inertia of the fan or other minor load and when the comparatively powerful engine backfires or stops for any reason, this inertia of the minor load and drive frequently causes shearing or breakage of a portion of the drive connection and frequently the drive shaft itself. Also, a difficult alignment problem has always presented itself for a heavy drive shaft has to be carefully aligned between the engine and the gears which connect to the vertical shaft for driving the fan.

An object of this invention is to provide an improved drive transmission mechanism for driving a remotely located device from an engine, which has been found satisfactory in service and may be readily and inexpensively installed.

Another object is to provide a drive transmission for turning a fan forming part of mechanical draft cooling equipment as an auxiliary device from an engine, in which the likelihood of breakdown of drive parts is minimized and substantially eliminated.

A further object is to provide a drive transmission which is especially adapted for driving an auxiliary device which is remotely located from an engine wherein the drive connections may be relatively light weight, easily aligned, and are inexpensive.

Still another object is, in a drive transmission of the class described, to provide for an increase in the R. P. M. throughout most of the drive connection permitting use of relatively light weight low inertia equipment and reduction of the R. P. M. adjacent to the device to be driven.

Other and further objects of this invention will appear as the description proceeds.

In the accompanying drawings forming a part of the instant specification and wherein like reference numerals indicate like parts in the various views:

Fig. 4 is a view taken along the line 4—4 in Fig. 1 in the direction of the arrows.

Figure 1:
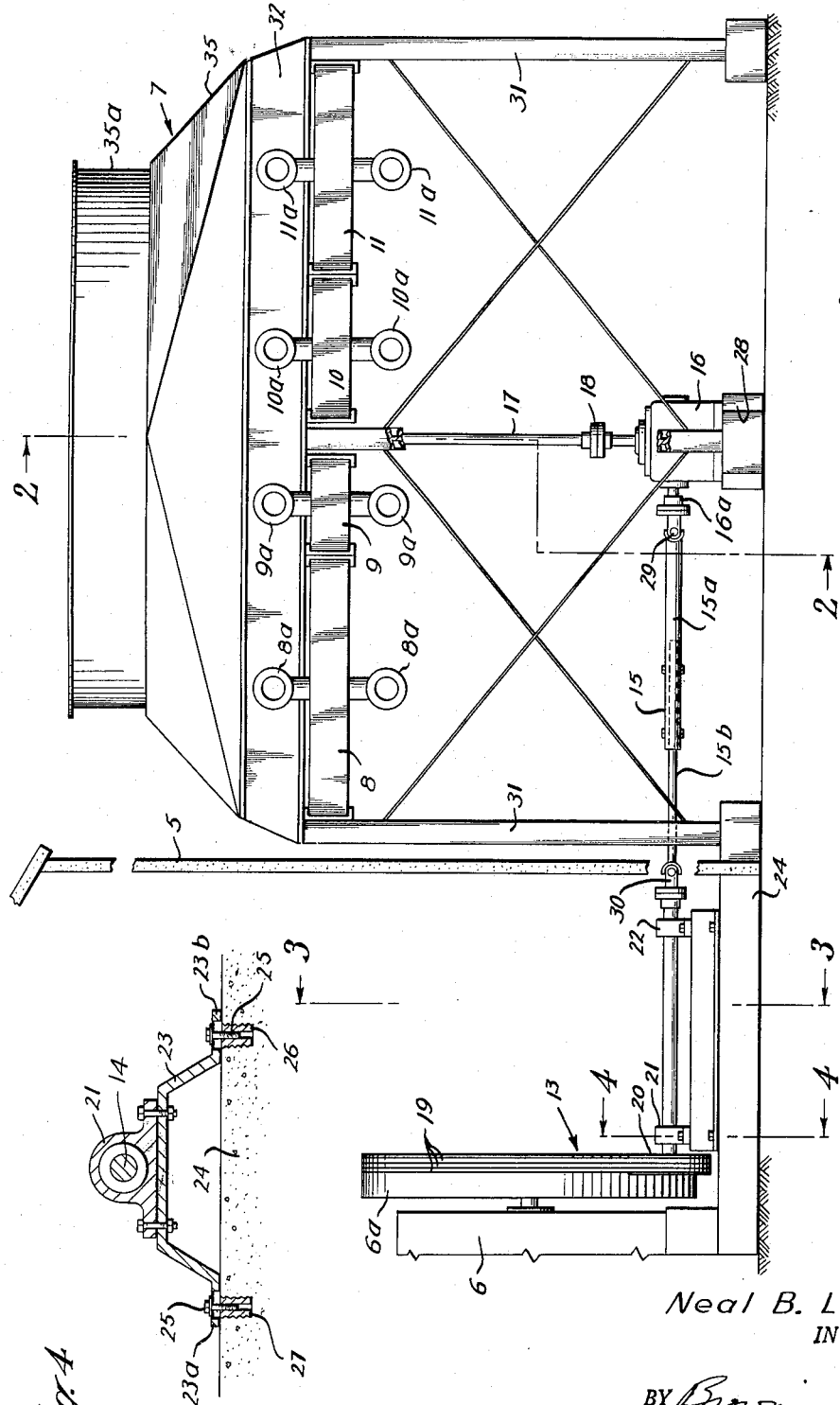
Fig. 1 is a schematic view mostly in side elevation but partly in section, illustrating cooling apparatus and an engine of a gasoline plant wherein the fan for the cooling apparatus is driven by the engine through a drive transmission embodying this invention.
Figure 2:
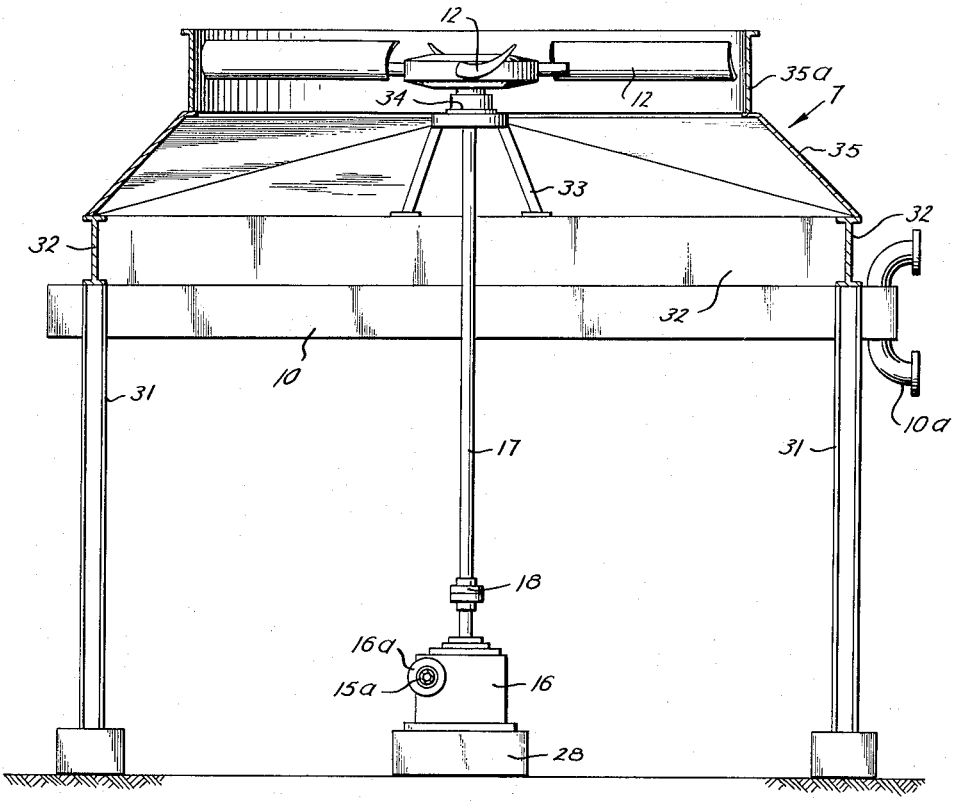
Fig. 2 is a view taken along the line 2—2 in Fig. 1 in the direction of the arrows.
Figure 3:
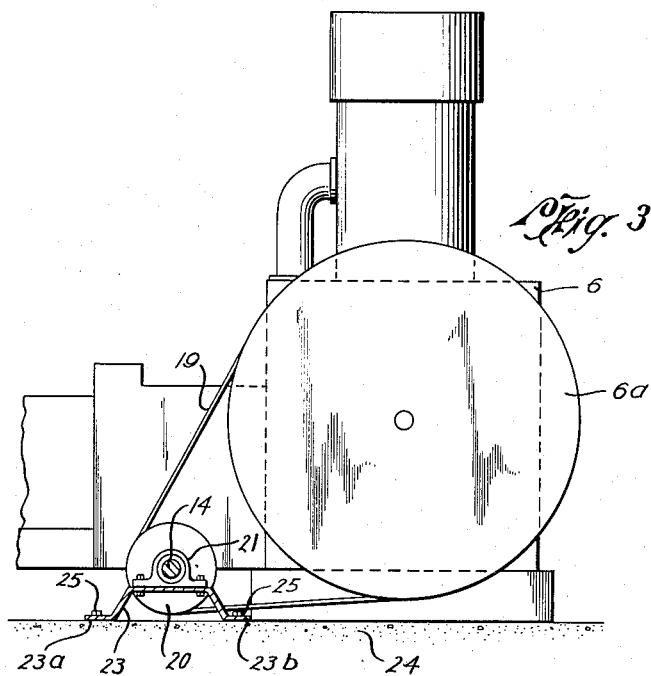
Fig. 3 is a view taken along the line 3—3 in Fig. 1 in the direction of the arrows.

Referring to the drawings in detail, and particularly Fig. 1, an engine house is designated by the numeral 5 which houses a stationary internal combustion engine 6. This engine is conventional equipment around plants such as gasoline plants, and may be quite a large engine developing H. P. in the neighborhood of 1,000. Outside the engine house 5 but as close as conveniently possible is located a cooler shown generally at 7. The cooler is of the direct heat exchange type and may contain a plurality of different size heat exchangers shown at 8, 9, 10 and 11. Air is forced past these exchangers through a fan which is shown in Fig. 2 at 12.

As heretofore indicated, the problem is to drive the fan 12 with a suitable drive connection with the stationary engine 6. In accordance with this invention, this is accomplished by providing a power takeoff from engine 6 including an R. P. M. step-up mechanism designated generally at 13, a relatively light jack shaft 14 driven by the output of the R. P. M. step-up mechanism. The jack shaft is connected through a light torque transmitting tube 15 to an R. P. M. reduction mechanism 16. The output of the R. P. M. reduction mechanism is connected through a shaft 17, which may include a flexible coupling 18 to the fan.

Referring to the details of the mechanism 13, this mechanism preferably is of the pulley and V-belt type. The pulley may be actually formed on the flywheel 6a of the engine by grooving its outer periphery to receive V-belts 19. The small pulley wheel 20 has its outer periphery grooved to receive V-belts 19 and is mounted rigidly on jack shaft 14. The ratio of the pulleys should be such as to increase the R. P. M. substantially such as, for an example, about four times. Actually, the ratio need not be exactly four, and might even extend over a wide range from just above unity to any higher ratio, depending on the amount of power to be transmitted and upon the rates of rotation of the engine drive shaft and the minor load device such as the fan illustrated.

The jack shaft 14, due to the relatively high rate of rotation at which it is intended to be used, may be constructed of relatively light weight, small diameter round stock. The shaft may be mounted so as to be readily adjusted to determine proper tensioning of the V-belts 19. To accomplish this, the shaft is journaled in two ball bearing race assemblies 21 and 22. These assemblies also hold the shaft against axial movement. These assemblies are mounted on a platform 23 which has outwardly extending flanges 23a and 23b adapted to be seated on a concrete mounting or the like 24. The flanges 23a and 23b have slotted openings through which the bolts 25 extend and are threaded in sleeves 26 and 27 anchored in the concrete platform or base 24. These slots are arranged to permit slight movement of the platform 23 on the base so as to properly tension the V-belts 19.

The reduction mechanism 16 is shown as a conventional reduction gear box. This mechanism may be mounted on a suitable base 28 and is located in vertical alignment with the hub of fan 12. The reduction mechanism need not be carefully aligned with the jack shaft although it should be mounted in approximate alignment. The input shaft 16a of the reduction mechanism is adapted to be connected through a universal joint 29 to the torque transmitting shaft 15. The other end of the shaft 15 is connected through a universal joint 30 with the jack shaft 14. The shaft 15, of course, is made up of two telescoping parts 15a and 15b which may slide relative to each other but are held against relative rotation so as to provide a drive shaft. Such a shaft is commonly termed a torque tube and is well understood by those skilled in the art.

Due to the universal joints and the telescoping character of shaft 15, only approximate alignment between the jack shaft and the input shaft of mechanism 16 is required. This facilitates materially the making of the installation and avoids the necessity of mounting the mechanism 16 with precision upon the base 28 to maintain it in both vertical and horizontal alignment with the jack shaft. Due to the very high rate of rotation, the torque tube may be relatively light and yet be able to transmit substantial H. P. to drive the fan. However, due to its very light weight and the light weight of the jack shaft 14, very little inertia is involved in the shaft so that in the event of a backfire or stoppage of the motor or engine 6, there is very little force placed upon the drive connection which might tend to shear some part of it. Also, the pulley arrangement, shown generally at 13, provides resiliency which will dampen the shock further reducing the likelihood of any breakage of parts.

In the installation illustrated, the cooler 7 includes a framework mounted on upright columns 31. These columns may be I-beams or the like and carry at their upper ends sills 32. The heat exchange units 8, 9, 10 and 11 are supported by the columns 31 and the sills 32. Primarily, they are supported by being attached in depending relation to the sills.

The fan 12 is mounted by suitable support legs 33 attaching to the sills which carry a journal 34 for the fan shaft. A venturi canopy and fan ring, 35 and 35a respectively, are carried on the sills so that when the fan is rotated air is drawn upwardly through the heat exchange units and exhausted upwardly from the fan ring.

The particular installation shown is that of a gasoline plant, and jacket water from the engine 6 and from other equipment of the plant is circulated through the heat exchanger 8, entering through one of the fittings 8a and the cooled water is withdrawn from the other of these fittings. The first stage gas, of the plant, is cooled in exchanger 9 entering through one of the fittings 9a and exhausting through the other. The second stage gas is cooled in exchanger 10 and enters one of the fittings 10a and is exhausted from the other. The heat exchanger 11 is used to cool the lube oil used in the plant and enters one of the fittings 11a departing from the other.

It is believed that the operation of the apparatus and drive connection is apparent from the foregoing description. In most installations of this type, the engine and the fan actually should revolve at approximately the same R. P. M. As an example, the engines usually operate at an R. P. M. of from 200 to 500, and the fan usually turns at 180 to 500 R. P. M. However, the step-up mechanism 13 is such to increase the rate of rotation of the jack shaft and torque tube sufficiently to make possible a reduction to a tolerable value the rotative force due to the inertia of the drive connection between the mechanism 13 and the mechanism 16. In the example, an increase to about four times the speed of the flywheel would be desirable so that if the flywheel turns at 300 R. P. M., the jack shaft will rotate at approximately 1200 R. P. M. Of course, this ratio is not critical and may vary as hereinbefore described. This high R. P. M. is used to transmit the torque from the flywheel to the reduction mechanism 16. The R. P. M. is then reduced so that the output of mechanism 16 meets the requirement for fan operation.

In transmitting the torque, the shaft 14 and shaft 15 operate at a relatively high R. P. M. and, therefore, may be made of very light materials considerably reducing the weight of these shafts as compared to their weight requirement where they rotated at the speed of either the engine or the fan. Due to this light weight, there is very little inertia tending to maintain the fan and its drive connection in rotation in the event of a backfire or stoppage of the engine 6. In addition, the use of a V-belt pulley step-up arrangement, as shown at 13, adds resiliency to the connection to absorb the shock in the event of motor failure.

The arrangement is very easily installed as compared to the requirements in the event a rigid drive shaft were used to transmit directly the power from the engine to the gear box 16. This is true because the arrangement of this invention permits the use of the universal joint between the tube 15 and the two shafts to which it is joined.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A drive mechanism for a low speed engine having an auxiliary power take-off shaft for delivering a fractional portion of the engine's power, a belt and pulley drive connected to the auxiliary power take-off shaft for stepping up the R. P. M., a jack shaft connected at one end to the output of the pulley drive, a lightweight rigid tubular drive shaft connected to the other end of the jack shaft, a R. P. M. reduction mechanism connected to the lightweight tubular shaft and high inertia load means, the output of the reduction mechanism being connected to the high inertia load means.

2. In mechanical draft cooling equipment, in combination, a low speed engine having an auxiliary power take-off shaft for delivering a fractional portion of the engine's power, a belt and pulley drive connected to the power take-off shaft for stepping up the R. P. M., a jack shaft having one end connected to one end of the output of the pulley drive, a lightweight rigid tubular drive shaft having one end connetced to the other end of the jack shaft, a R. P. M. reduction mechanism connected to the other end of the lightweight tubular shaft, a heat exchanger having a high inertia fan, the fan being connected to the output of the reduction mechanism.

References Cited in the file of this patent

UNITED STATES PATENTS

| | | |
|---|---|---|
| 1,104,809 | Laviollette | July 28, 1914 |
| 1,896,901 | Knapp et al. | Feb. 7, 1933 |
| 2,012,225 | Duvelsdorf | Aug. 20, 1935 |
| 2,116,539 | Payne et al. | May 10, 1938 |
| 2,271,415 | Coulon | Jan. 27, 1942 |
| 2,319,060 | Harris | May 11, 1943 |
| 2,346,032 | Kinnucan | Apr. 4, 1944 |
| 2,366,376 | Young et al. | Jan. 2, 1945 |
| 2,401,918 | Elder et al. | June 11, 1946 |
| 2,441,446 | Schmitter | May 11, 1948 |
| 2,518,760 | Dieter | Aug. 15, 1950 |
| 2,536,248 | Alexander | Jan. 2, 1951 |
| 2,603,196 | Dieter | July 15, 1952 |
| 2,645,944 | Crichton et al. | July 21, 1953 |